Dec. 4, 1945.   W. H. DE LANCEY   2,390,239
COUNTING MECHANISM
Filed April 1, 1943   7 Sheets-Sheet 1

Fig. 1.

INVENTOR,
Warren H. DeLancey,
BY
Chapin & Neal
ATTORNEYS.

Dec. 4, 1945.  W. H. DE LANCEY  2,390,239
COUNTING MECHANISM
Filed April 1, 1943   7 Sheets-Sheet 2

INVENTOR,
Warren H. DeLancey,
BY
Chapin + Neal.
ATTORNEYS.

Dec. 4, 1945.   W. H. DE LANCEY   2,390,239
COUNTING MECHANISM
Filed April 1, 1943   7 Sheets-Sheet 3

INVENTOR,
Warren H. DeLancey,
BY
Chapin & Neal
ATTORNEYS.

Dec. 4, 1945.   W. H. DE LANCEY   2,390,239
COUNTING MECHANISM
Filed April 1, 1943   7 Sheets-Sheet 4

INVENTOR,
Warren H. DeLancey,
BY
Chapin + Neal
ATTORNEYS.

Dec. 4, 1945.  W. H. DE LANCEY  2,390,239
COUNTING MECHANISM
Filed April 1, 1943  7 Sheets-Sheet 5

INVENTOR,
Warren H. DeLancey,
BY
Chapin & Neal.
ATTORNEYS.

Dec. 4, 1945.                W. H. DE LANCEY                2,390,239
                              COUNTING MECHANISM
                       Filed April 1, 1943         7 Sheets-Sheet 6

INVENTOR,
Warren H. DeLancey,
BY Chapin & Neal
ATTORNEYS.

Dec. 4, 1945.    W. H. DE LANCEY    2,390,239
COUNTING MECHANISM
Filed April 1, 1943    7 Sheets-Sheet 7

INVENTOR,
Warren H. DeLancey,
BY
Chapin + Neal
ATTORNEYS,

Patented Dec. 4, 1945

2,390,239

UNITED STATES PATENT OFFICE 2,390,239

COUNTING MECHANISM

Warren H. De Lancey, Springfield, Mass., assignor to Gilbert & Barker Manufacturing Company, West Springfield, Mass., a corporation of Massachusetts Application April 1, 1943, Serial No. 481,384

16 Claims. (Cl. 235—144)

This invention relates to improvements in resettable counting mechanisms, such for example, as are used in computers for gasoline measuring and dispensing pumps.

The invention has for one object to provide a simplified and improved means for resetting each number wheel of a counter unit to zero—operable by turning back the number wheels, thereby avoiding the shutters which are necessary to conceal the number wheels when they are advanced to zero.

More particularly, the invention has for its object to provide in a counter, having a plurality of number wheels supported on a common shaft and having locking transfer means between adjacent number wheels for driving the higher order wheel in a counting direction from the wheel of lower order, means automatically operable by a change in direction of rotation of said shaft from a counting to a resetting direction to unlock each wheel, except the wheel of lowest order, from its transfer means and to relock them on a change in direction of rotation of the shaft from a resetting to a counting direction, and means operable by rotation of said shaft when said wheels are unlocked, to turn them back to zero, the wheel of lowest order being driven in a counting direction by the same means which drives it in a resetting direction.

The invention has for another object to provide an improved counter, capable of being easily assembled in, or removed from, the frame of the counting mechanism as one unit and including means on the shaft of the number wheels for resetting the same and for unlocking each number wheel from the transfer means which drives it in a counting direction from the adjacent wheel of lower order—the locking and unlocking of the wheels and transfer means being automatically effected by a change in direction of rotation from resetting to counting directions and vice versa without resort to any means extraneous of the counting unit.

The invention has for a further object to provide in a counter of the type described, wherein a number wheel is unlocked from the transfer gear which drives it for the purpose of enabling the wheel to be turned back to zero, means for preventing such wheel, while thus unlocked, from being moved in a counting direction by the means intended to reset it.

These and other objects will best be understood as the detailed description proceeds and they will be pointed out in the appended claims.

The invention will be disclosed with reference to the accompanying drawings, in which.

Figure 1:
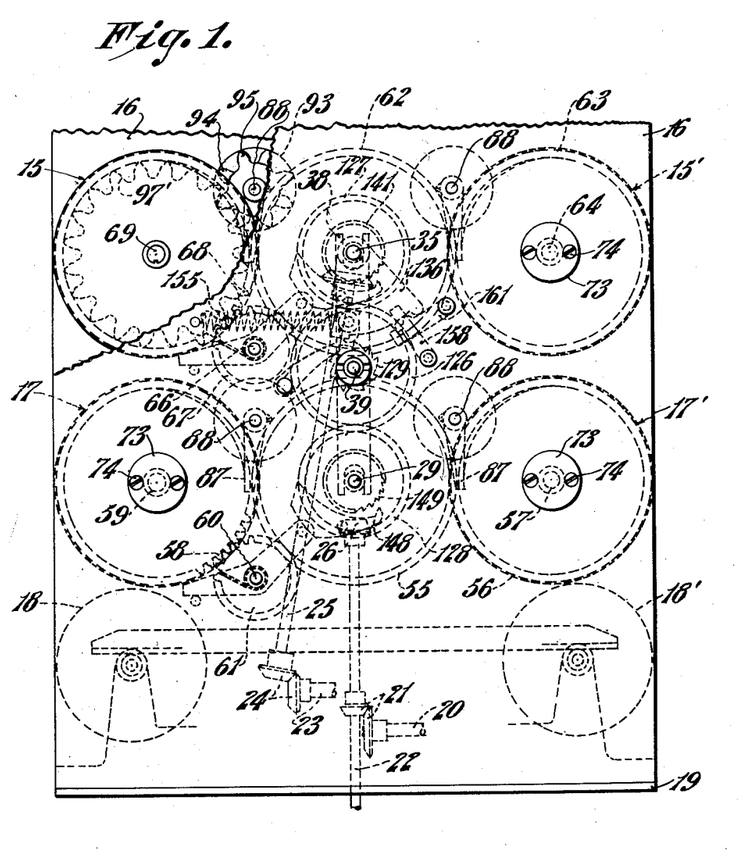
Fig. 1 is a side elevational view with parts broken away of a computing counting mechanism embodying the invention.

Referring to these drawings and first to Fig. 1 thereof, the invention has been shown for illustrative purposes as embodied in a counting mechanism for use in a computing-type gasoline pump adapted to show from opposite sides of the pump both the cost and quantity of the gasoline dispensed. There are a pair of cost counters, generally indicated at 15 and 15', mounted near the top and one near the front end and one near the rear end of the spaced side plates 16 of the fixed framework of the mechanism. Below these cost counters are front and rear quantity counters, generally indicated at 17 and 17', mounted one near each end of said plates. Below the quantity counters are front and rear wheels 18 and 18' which display the unit price of the gasoline and which are intended to shift gears in a change speed mechanism or variator. This variator may for example be of the type disclosed in my prior Patent No. 2,311,031, dated Feb. 16, 1943, and may be located as therein disclosed, viz., in the space between the two price selector wheels and below the level of the quantity counters and above the base 19 of the fixed framework.

The variator of said patent is indicated only in part in Fig. 1 and just sufficiently to show how it can be applied to the mechanism disclosed. The driving shaft of the variator is shown at 20, driven by bevel gears 21 from a vertical shaft 22, which is adapted to be actuated by the meter of the gasoline pump. The driven shaft of the variator is shown at 23 and it is connected by bevel gears 24 to an inclined shaft 25. The shafts 22 and 25 are suitably supported as indicated in the patent and extend upwardly to actuate the quantity and cost counters, respectively.

Figures 3, 4:
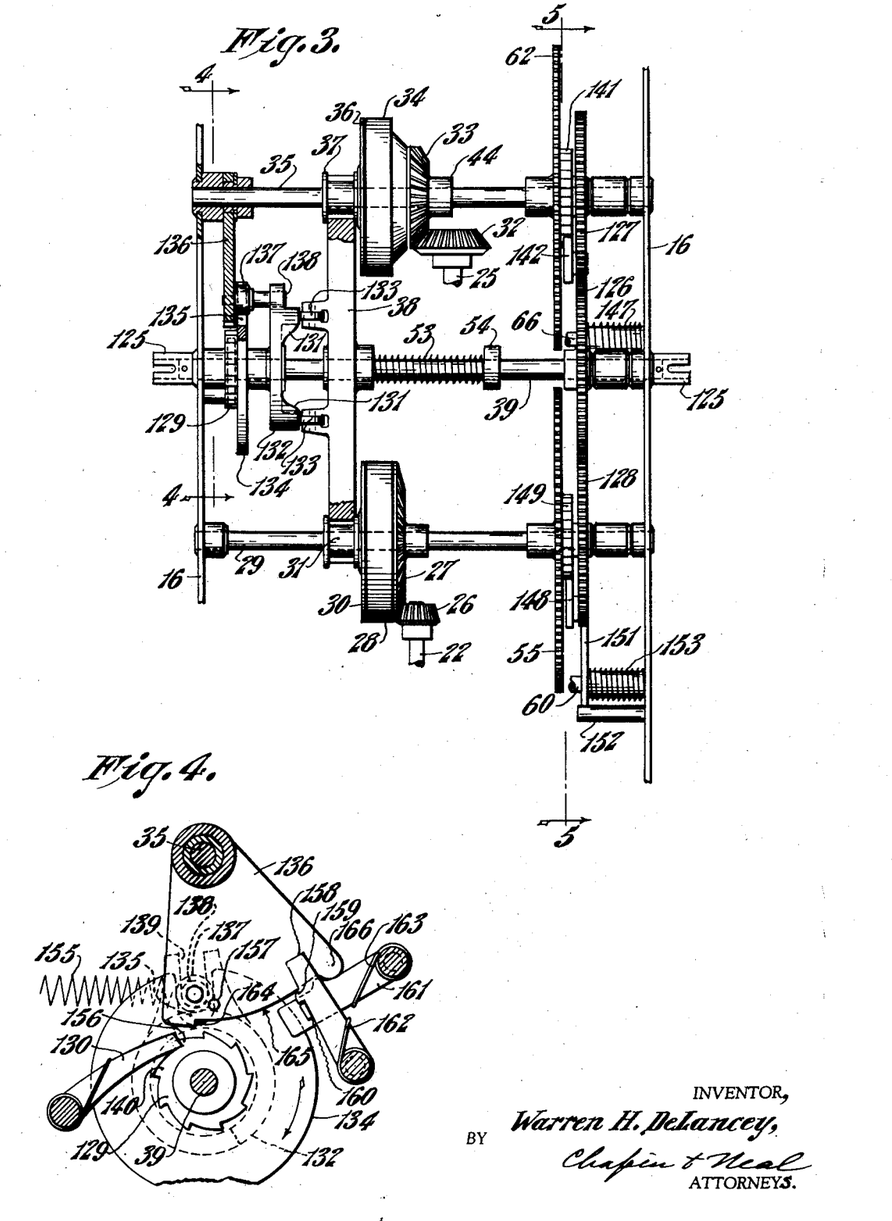
Fig. 3 is a cross sectional view taken on the line 3—3 of Fig. 2.
Figs. 4 and 5 are fragmentary sectional elevational views, drawn to a larger scale and taken on the lines 4—4 and 5—5, respectively, of Fig. 3.

Referring now to Fig. 3, the shaft 22 has fixed on its upper end a bevel pinion 26, meshing with a bevel gear 27, formed on a hollow drum 28, mounted to turn on a cross shaft 29, which is rotatably supported at its ends in bearings on the side plates 16. This drum 28 forms one element of a clutch. The other clutch element, marked 30, is fixed to the shaft 29 and has associated therewith an axially shiftable clutch collar 31. The shaft 25 has fixed on its upper end a bevel pinion 32, meshing with a bevel gear 33, formed on a hollow drum 34, mounted to turn on a cross shaft 35, which is rotatably supported at its ends in bearings on the plates 16. This drum 34 forms one element of a clutch. The cooperating element 36 is fixed to shaft 35 and has associated therewith an axially shiftable clutch collar 37. A single shifter member 38 is provided for both clutches. This member is slidably mounted at a point intermediate its ends on a shaft 39 and has its ends forked, one to engage collar 31 and the other to engage collar 37. The shaft 39 lies between shafts 29 and 35 and is rotatably supported at its ends in bearings on plates 16.

Figure 7:
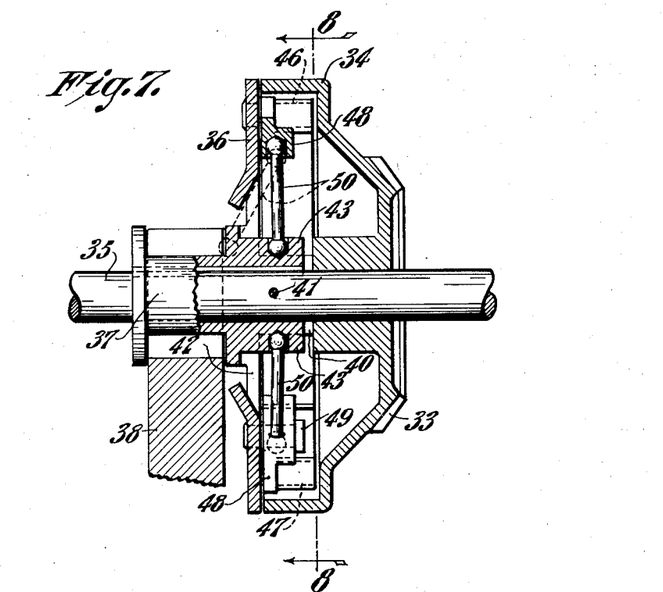
Fig. 7 is a cross sectional view of one of the clutches used to disconnect the counter driving means during resetting.
Figure 8:
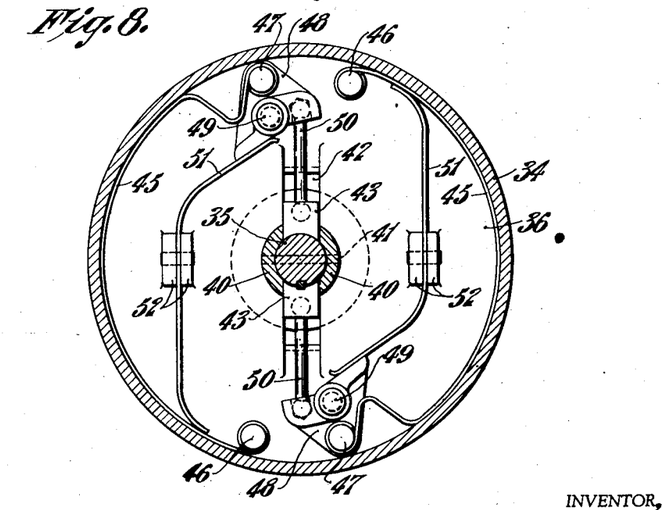
Fig. 8 is a sectional view thereof taken on the line 8—8 of Fig. 7.

The two clutches are alike in construction and a description of one will suffice for both. Referring to Figs. 7 and 8, the clutch element 36 is a circular plate having a split hub. The two halves of this hub are shown in section at 40 in Fig. 8. A pin 41 extends through the two halves 40 and through shaft 35 whereby the plate is held against movement axially on the shaft and is caused to turn therewith. The plate 36 has a rectangular opening 42 equal in width to the space between the hub halves 40. The clutch collar 37 has upper and lower extensions 43 which pass through opening 42 and slide on opposite sides of shaft 35, slidably fitting between the hub halves 40 and the side walls of opening 42. These parts 43 would be driven by plate 36 because of their engagement with the side walls of hole 42 but they may also be driven by the feather key connection shown between the clutch collar and shaft. The drum 34 is held from axial movement by the abutment of its hub with the end faces of hub halves 40 and by the bevel gear 32. Instead of the gear 32, a separate collar 44 may be provided for the purpose on shaft 35 as shown at 44 in Fig. 3. Cooperating with the interior periphery of drum 34 are shoes, each consisting of an arc-shaped band 45 of spring metal, pivoted at one end on a stud 46 fixed to plate 36. The other end of each shoe is pivotally connected to a stud 47 on a rocker 48, pivoted on a stud 49 fixed to plate 36. A link 50, having ball ends, connects each rocker to the adjacent member 43—the ball ends fitting in sockets one in the rocker and one in member 43 to allow the necessary amount of rocking motion. The bands 45 are shown expanded against drum 34. To effect this result collar 37 was moved axially to the right as viewed in Fig. 7 and the links 50 pushed from the dotted to the full line position. This causes the links to push radially outward against rockers 48, turning them counterclockwise, as viewed in Fig. 8, and forcing the bands 45 tightly against the drum 34 with sufficient pressure to prevent any slip between the driving element 34 and the driven element 36 of the clutch. Each band 45 has an approximately V-shaped bend therein near its connection to its rocker 48. This bend is provided to take up any over-travel in the movement of the links 50 and rockers 48. The clutch is locked in closed position by toggle action of the links 50. The centers of the inner ball ends of the links lie to the right of the line of centers extending between the outer ball ends. When the clutch collar is moved to the left, as viewed in Fig. 7, the links 50 are pulled across the line of centers to break the toggle lock and then drawn to inclined positions, one of which is shown by dotted lines in Fig. 7. The rockers are thus turned clockwise as viewed in Fig. 8, thereby drawing the bands away from drum 34 except for a small portion, as hereinafter described. A flat spring 51 fixed at a point intermediate its ends to and between a pair of lugs 52 on plate 36, has one end bearing on the tailpiece of a rocker 48 for the purpose of holding these rockers and bands 45 in released position. This spring is strong enough to release the clutch and move clutch shifter 38 back to open position after the toggle lock has been broken. A separate spring, such as 53 in Fig. 3, is provided for the purpose of breaking the toggle lock and starting the release of the clutches. This spring 53 acts between a collar 54 on shaft 39 and the shifter 38. Each flat spring has its other end bearing against the adjacent clutch band 45 at a location close to the pivot 46 thereof. The purpose of this arrangement is to maintain a certain minimum amount of pressure on the drum 34 in order to avoid errors due to backlash. The bands can be released except for a short length near the pivot points. A minimum pressure is therefore maintained which is enough to prevent any relative rotative movement between the clutch elements 34 and 36, except when such movement is intentionally effected as during resetting of the counters which occurs as hereinafter described. During movement of the counters in a counting direction, the clutch elements are locked together to preclude any possibility of slip at that time. While according to many features of the invention various other kinds of clutches might be used for the purpose, the particular clutch shown has the important advantages, above noted, which make it especially desirable for use in a counting mechanism such as described.

Figure 6:
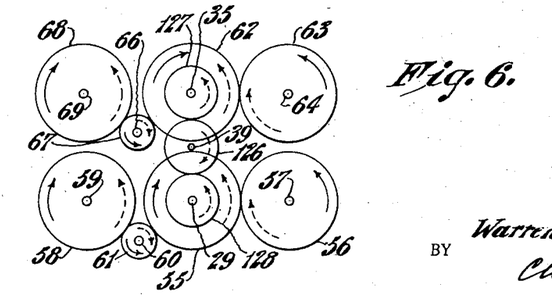
Fig. 6 is a diagrammatical view illustrative of the gear trains for actuating the several counters in both counting and resetting directions.

The cross shaft 29 actuates the front and rear gallons counters through the following gearing. A gear 55 (Fig. 1) fixed on shaft 29 meshes with a gear 56 of equal size fixed to the shaft 57 of the rear gallons counter 17'. This same gear 55 also drives a gear 58 on the shaft 59 of front gallons counter 17, through the intermediary of two idlers fixed on a shaft 60, rotatably mounted at its ends in plates 16. One such idler is shown at 61 in Fig. 1 as meshing with gear 58. The other idler is of the same size as idler 61 and lies directly in back of it and in mesh with gear 55. The gear 58 is located adjacent the front plate 16, as viewed in Fig. 1, and the gear 57 is located adjacent the rear plate 16. The two gears 56 and 58 are driven in opposite directions. Thus, when one faces either counter 17 or 17' the figures will move in the same direction—in this case upwardly during counting and downwardly during resetting. The cost counters are similarly driven. A gear 62 fixed on shaft 35 adjacent rear plate 16 (Fig. 2) directly drives a gear 63 of equal size fixed on the shaft 64 of the rear cost counter 15'. The same gear 62 drives an idler gear 65 fixed on a cross shaft 66 rotatably mounted at its ends in bearings in plates 16. Also fixed on this same cross shaft is an idler 67 which drives a gear 68 which is equal in diameter to gear 62 and which is fixed to the shaft 69 of the front cost counter 15. The cost counters move in opposite directions for the same reason as above described. The described gearing is also shown diagrammatically in Fig. 6 apart from the rest of the mechanism. The full line arrows in Fig. 6 indicate directions of rotation during counting and the dotted line arrows indicate directions of rotation during resetting. Resetting of the counters is accomplished, as will later be explained in detail by reverse rotation of the same gear trains which advance the counters during a counting operation but only after the two clutches shown in Fig. 3 have been opened.

The counters 15, 15', 17 and 17' are of identical construction and a description of one will suffice for all. The counter 15 will be described with reference to Figs. 9 to 12 inclusive. This counter comprises three number wheels 70, 71 and 72 for cents, tens and dollars, respectively. Each number wheel bears equally spaced on its external periphery the numbers 0, 1, 2, 3, 4, 5, 6, 7, 8, 9. Each number wheel is rotatably supported from shaft 69. This shaft is rotatably supported at its ends in bearings 73 which have flanges secured by two screws 74 (Fig. 1) to the adjacent plate 16 in a manner to permit convenient removal. Spacer sleeves 75 are provided between each bearing 73 and the counter unit in order to hold the latter in proper axial position on shaft 69. By removing the bearings 73, the shaft 69 carrying the entire counter unit can be removed.

Figure 10:
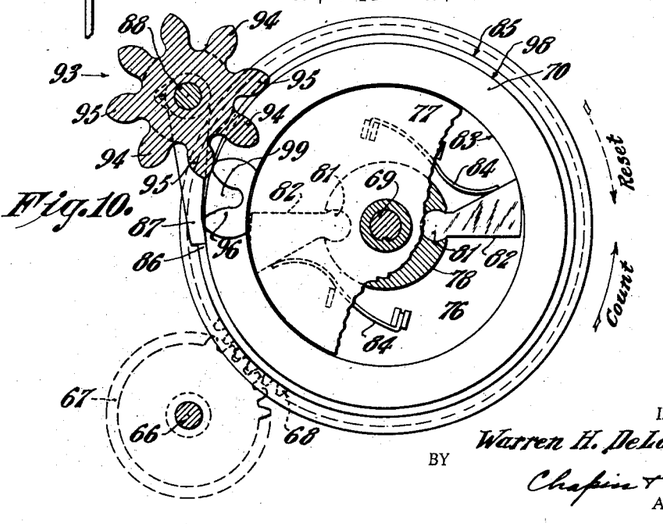
Figs. 10, 11 and 12 are sectional views taken on the lines 10—10, 11—11, and 12—12, respectively, of Fig. 9.

The number wheel 70 of lowest order is driven by gear 68 through the clutch shown in Fig. 10 both during counting and resetting. The number wheel 71 of next higher order is driven in a counting direction from wheel 70 by the usual Geneva type transfer gear—being moved one step or 36° for each revolution of wheel 70. Wheel 71 is driven in a resetting direction from shaft 69 without disengaging this transfer gear, by means of the clutch shown in Fig. 11. The wheel 72 of highest order is driven in a counting direction from wheel 71 by the same kind of transfer gear used to drive wheel 71—being moved one 36° step for each revolution of wheel 71. Wheel 72 is driven in a resetting direction from shaft 69 without disengagement of its transfer gear, by means of a clutch which is identical in construction to that shown in Fig. 11 but which has not been shown herein to avoid unnecessary duplication.

Figure 9:
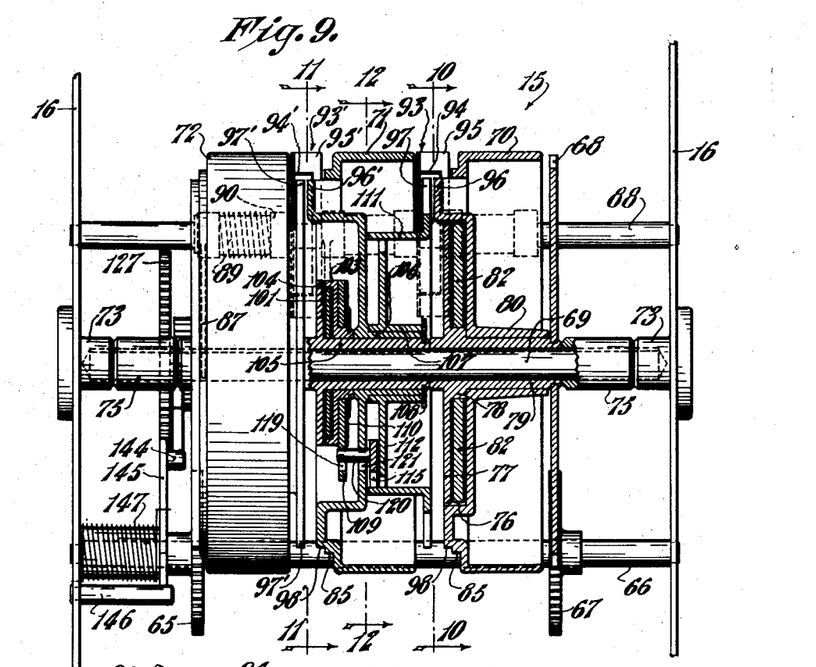
Fig. 9 is a sectional view of one of the counters taken on the line 9—9 of Fig. 2.

Referring now to Figs. 9 and 10, the number wheel 70 in the face which confronts wheel 71 is provided with a shallow cylindrical recess 76 for the purpose of receiving a circular disc 77. This disc has a short hub 78 of relatively large diameter and a long hub 79 of relatively small diameter. The number wheel 70 has a hub 80 which is rotatably mounted on the long hub 79. This hub is keyed to shaft 69 and on its outer end bears the driving gear 68 suitably fixed thereto. The short hub 78 is grooved to receive the part-cylindrical inner ends 81 of two driving dogs 82. The outer ends of these dogs are pressed into engagement with the inner peripheral surface of the drum-like boundary wall 83 of recess 76, as by springs 84 fixed to plate 77 as indicated. When shaft 69 is turned in a counterclockwise direction during a counting operation, the dogs 82 will tend to dig into the wall 83 and rotate the number wheel 70 without any liability of slip. So also, when the shaft 69 is turned in a clockwise direction, the dogs 82 will also turn the number wheel backwardly until it reaches zero position but after that the dogs will readily slip over surface 83 as is required.

The number wheel 70 has a peripheral surface 85 which is cylindrical except for a single ratchet tooth 86 formed therein. The free end of a pawl 87, pivotally mounted on and depending from a cross rod 88, rides on surface 85 and serves to engage tooth 86 and arrest wheel 70 in zero position when the wheel is turned clockwise for resetting. The rod 88 is fixed at its ends in the side plates 16 and carries other similar pawls, one for the number wheel 71 and one for the number wheel 72 for the purpose of arresting them at zero positions in a similar manner. This rod 88 and three others shown in Fig. 1 serve to tie together the side panels 16 and maintain them in proper spaced relation. Each pawl 87 is moved toward the periphery of surface 85 by a torsion spring 89, one end of which is fixed to an ear in the hub of pawl 87, and the other end of which is fixed in the ear of a collar 90, pinned to rod 88. The hub of pawl 87 is extended toward the collar 90 and is provided with two diametrically opposed teeth 91 to engage one in each of two diametrically opposed notches in collar 90. Each notch is enough wider than its tooth to allow just the necessary amount of swinging movement of the pawl. Thus, when a counter unit is removed, excess movement of the pawl is prevented and the pawls are held back in positions where they cannot interfere with convenient replacement of the counter unit.

Figure 2:
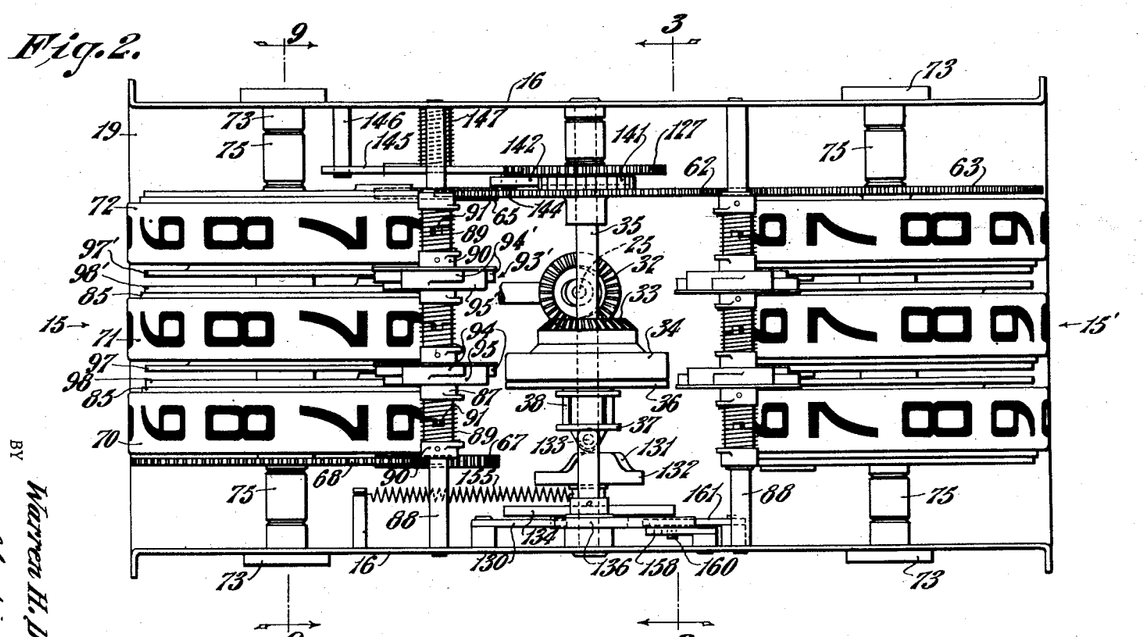
Fig. 2 is a plan view thereof.

The locking transfer means, by which the wheel 70 at the end of each revolution moves wheel 71 one tenth of a revolution and by which wheel 71 is locked against revolution during the rest of the revolution of wheel 70, is of a known type. It involves a pinion 93 (Fig. 10) herein shown as having eight teeth and mounted to turn freely on rod 88. This pinion is held against axial movement between a pawl 87 and a collar 90 as shown in Fig. 2. This pinion has four wide teeth 95 and four teeth 94 of less width, as will be clear from Figs. 2 and 9. The pinion 93 is intermittently engaged and turned to the extent of two teeth by a segment 96 having two teeth formed on wheel 70. This pinion is also in constant mesh with a large gear 97, having in this case 20 teeth, which gear is associated with wheel 71 and drives it in a counting direction. Each actuation of pinion 93 will move gear 97 two teeth, or one-tenth of a revolution, and thus turn wheel 71 the required amount to advance the wheel by one number. Formed on wheel 70 and located between the segment 96 and the surface 85, is a cylindrical surface 98 which is complete except that it does not bridge the space between the two teeth of segment 96. The teeth 94 are wide enough (Fig. 9) to be engaged both by the teeth of segment 96 and those of gear 97. The teeth 95 are enough wider so that they may engage the surface 98. The relative positions of the parts shown in Fig. 10 are those which exist when wheel 70 is in zero position. Two of the wide teeth 95 are engaged with surface 98, whereby the pinion 93 is locked against rotation and with it the number wheel 71. An intervening tooth 94 which is not wide enough to reach the surface 98, projects radially inward into a position where it will be engaged by the segment 96 near the end of the counterclockwise movement thereof. But the segment 96 is now free to turn throughout an angle of 324° without turning the pinion 93. At the end of this 324° movement, the leading tooth of segment 96 engages the said tooth 94 and moves it, turning the pinion. As the turning movement continues, that wide tooth 95 which immediately trails said tooth 94, will ride into the recess 99 between the teeth of segment 96 and be turned by the second tooth of the segment 96. This continues until the parts move into the positions illustrated wherein the last-named tooth 95 bears on the leading part of surface 98. At the same time the next succeeding tooth 95 will have come to bear on surface 98. Pinion 95 has thus become locked after having been turned two teeth or one-eighth of a revolution.

A locking transfer means of the same kind is provided between the wheels 71 and 72, whereby the wheel 71 near the end of each revolution will move wheel 72 one-tenth of a revolution. The parts of this second transfer means have been designated by the same reference numerals with the addition of a prime.

Figure 11:
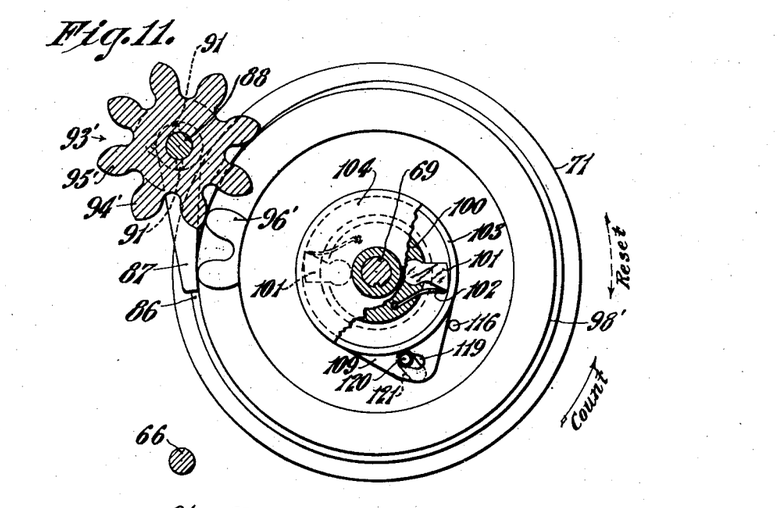

For resetting wheel 71 the clutch device shown in Fig 11 is used. A hub 100, keyed to shaft 69, is grooved at two diametrically opposite locations to receive the inner and part-cylindrical ends of the driving dogs 101. These dogs are pressed by springs 102 into engagement with the internal peripheral surface of a shallow drum 103. The hub 100 has an integral circular flange 104 (see also Fig. 9) which serves to close the otherwise open face of this drum. The hub 100 further has a sleeve like extension 105 (Fig. 9) which rotatably supports the hub 106 of number wheel 71. Upon hub 106, the hub 107 of gear 97 is rotatably mounted. Hub 107 as well as hub 106 is held in place axially by a split washer 108 engaged in a groove in hub 105. Rotatably mounted on the hub of drum 103 is a friction plate 109 which is pressed against the back of the drum by a spring 110, secured in a groove in the hub of the drum. When the drum 103 is turned by clockwise rotation of hub 100, as viewed in Fig. 11, the plate 109 will be carried with it because of the frictional engagement between the plate and drum.

The number wheel 71 cannot, however, be turned unless and until it is disconnected from gear 97 which, it will be remembered, is held against rotation by the Geneva lock of its driving pinion 93. This gear 97 has an integral annular part 111 (Figs. 9 and 12) which is integrally connected to hub 107 by a web 112. Formed in the internal periphery of part 111 (Fig. 12) is a series of grooves 113 each having one edge forming a square shoulder 114 and the opposite edge rounded. These grooves are formed in that portion of part 111 which lies to the left of the web 112, as viewed in Fig. 9. A pawl 115 (Fig. 12) is pivoted at a point intermediate its ends on a stud 116 and has at one end a tooth 117 which is engageable in any of the notches 113 and which is provided with a square face to engage the square edge 114 of that notch in which it lies. The opposite face of tooth 117 is beveled. A spring 118, secured as indicated at a location intermediate its ends on the web 112, presses the toothed end of the pawl radially outward and yieldingly holds it engaged in one of the notches 113. The pawl then locks the number wheel 71 to its driving gear 97 and rotation of the driving gear in a counterclockwise direction will through pawl 115 pull the number wheel along with it.

The pawl 115 is actuated by means of the friction plate 109 which is provided with a cam slot 119 to receive the outer end of a pin 120, fixed on the trailing end of the pawl. This pin passes through a slot 121, which is formed in the web of the number wheel 71 and curved from pivot 116 as a center (Fig. 11). On the very first part of a clockwise movement of shaft 69 the plate 109 is turned with the shaft and one wall of slot 119 acts on pin 120 like a cam and forces it radially outward, thereby moving pawl 115 so as to withdraw tooth 117 from the notch 113 in which it was engaged. The number wheel 71 is now unlocked from its driving gear 97 and is free to be turned by continued clockwise movement of plate 109. The wheel 71 turns with the plate 109 because of the pin 120 which interconnects the two. This will be clear from Fig. 9. Turning of wheel 71 continues until the tooth 86 thereon (Fig. 11) abuts the zero stop pawl 87 provided therefor. On continued clockwise turning of the clutch drum 103, it will slip on the plate 109 which is now held stationary.

Figure 12:
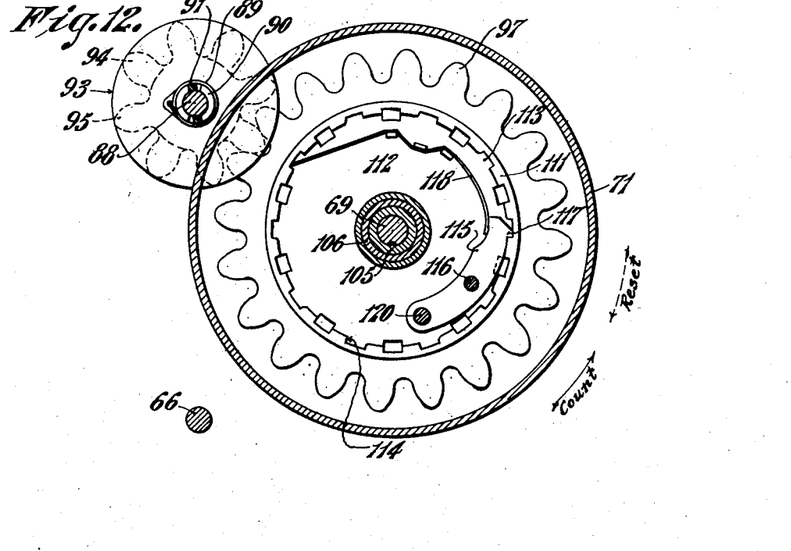

To prevent one from advancing the number wheel 71 while it is unlocked from its driving gear for the resetting operation, the spring 118 has its trailing end engaged, as shown in Fig. 12, with the grooved internal peripheral surface of gear 97. The engagement is like that of a pawl and ratchet, the spring snapping from one groove 113 to another as it turns clockwise with the web of the number wheel. However, if while the wheel 71 is unlocked from gear 97 one attempts to cheat by trying to turn the wheel 71 counterclockwise in the counting direction to increase the reading of the wheel, such movement is prevented by the spring the free end of which soon brings up against a square edge 114 of one of the grooves. The gear 97 which is stationary and held against turning motion by the Geneva lock described, arrests the spring and thus the number wheel 71 which turns it.

The number wheel 71 will again become locked to its driving gear 97 on the very first part of the counterclockwise rotation of shaft 69 in the next counting operation. The dogs 101 turn drum 103 and friction plate 109 far enough to cam pin 120 inwardly, thus swinging pawl 115 in a direction to carry tooth 117 into one of the grooves 113. The beveled face of this tooth and the rounded edge of each groove facilitate entry of the tooth into the groove. With the number wheel now locked to gear 97 and the latter held stationary by the Geneva lock, the dogs 101 of the clutch slip as the counterclockwise motion continues. The clutch slips readily in this direction.

The number wheel 72 is provided with identical means for resetting it, including a clutch like that of Fig. 11, locking means between the number wheel and its driving gear like that shown in Fig. 12 and means such as shown in Figs. 9 and 11 for automatically actuating the locking means to unlock it on clockwise movement of shaft 69 and lock it on counterclockwise movement of such shaft.

The resetting motion of shaft 69 and the corresponding shafts 57, 59 and 64, is effected by manually turning the above described shaft 39, which is done by the usual or any suitable means which are adapted to be engaged with one or the other of the coupling elements 125 fixed on shaft 39 (Fig. 3). This shaft carries a main reset gear 126 which meshes with and drives reset gears 127 and 128, mounted to turn freely on shafts 35 and 29, respectively, and arranged to be coupled to the gears 62 and 55, respectively, after the latter have been disconnected from their drive shafts 25 and 22 by the opening of the clutches shown in Fig. 3. The gears 126, 127 and 128 are of equal diameter. The reset shaft 39 has fixed thereto a ratchet 129 (Fig. 4) engaged by a spring pressed pawl 130, pivoted to one of the plates 16 as shown in Fig. 2, whereby shaft 39 must initially be turned in a clockwise direction and may not turn backward except by the relatively small angular increments corresponding to the length of the teeth of the ratchet. The shaft 39 is arranged to be turned one complete revolution and 45° more and then to be turned backwardly 45°. During the first 45° of clockwise rotation, the clutches on shafts 29 and 35 are opened in order to free gears 55 and 62 and their shafts 29 and 35 from driving connection with counter driving shafts 22 and 25, respectively, and then the gears 128 and 127 are respectively coupled to said gears. The ensuing 360° clockwise movement of shaft 39 causes one complete revolution of the number wheel shafts 69 and 59 in a counterclockwise direction and of the shafts 64 and 57 in a clockwise direction as viewed in Figs. 1 and 6, which is sufficient to completely reset the described number wheels. It is to be noted that Figs. 10, 11 and 12 are taken oppositely from Figs. 1 and 6. Therefore, the counterclockwise direction for resetting, shown by dotted lines on the gear 68 in Fig. 6, corresponds with the clockwise direction for resetting shown on the number wheel 70 in Fig. 10 and on the number wheel 71 in Figs. 11 and 12. On completion of the 405° clockwise movement of shaft 39, the shaft is turned 45° in a counter-clockwise direction and, during this interval, the gears 128 and 127 are disconnected from gears 55 and 62, respectively, and these gears 55 and 62 are reconnected to their respective driving shafts 22 and 25.

The opening and closing of the clutches on shafts 35 and 29 is controlled by two cams 131 (Fig. 3) formed on a member 132, mounted to turn freely on the reset shaft 39. These cams engage cam followers 133 on the described clutch shifter 38. Fixed on shaft 39 adjacent member 132 is a disc 134 having a single, radially-directed notch 135 (Fig. 4) in its periphery. The described ratchet 129 is, or may be, a part of this disc and both ratchet and disc are held against axial movement between the cam member 132 and the adjacent end face of the nearest bearing for shaft 39 (see Fig. 3). Loosely mounted on shaft 35 and held in axial position thereon, as indicated in Fig. 3, is a segment 136, carrying near one lower corner a roll 137 to fit into the notch 135. A pin extension 138 of the stud of roll 137 (Fig. 3) extends into a radial slot 139 in the cam member 132. Now as shaft 39 is turned clockwise, the disc 134 acting on roll 137 will swing segment 136 to the right as viewed in Fig. 4 and this action will continue until roll 137 moves completely out of notch 135 and rides onto the smooth periphery of disc 134. The segment, through pin 138, moves cam member 132 to allow the clutch shifter 38 to be moved to the left by spring 53 and release the clutch 28—30 and the clutch 34—36, so far as is necessary and intended. The shafts 29 and 35 can then turn while gears 27 and 33 remain stationary. A movement of 45° is imparted to the cam member but the clutches are released during the first part of such movement.

The first tooth, marked 140, of ratchet 129 is somewhat over 45° in angular extent (Fig. 4). This is necessary, as will later appear, to permit the 45° return movement at the end of the resetting cycle. However, it would be possible for the operator, having moved the shaft clockwise far enough to open the clutches, to turn the shaft backward to its initial position. This, however, will do no harm as resetting of the number wheels has not been started. Only the clutches on shafts 29 and 35 have been released and these will simply be re-engaged. But if one continues the clockwise movement far enough to start resetting, the pawl 130 drops in back of tooth 140 and then shaft 39 cannot be brought into its initial position except by completing the intended amount of clockwise movement.

Figure 5:
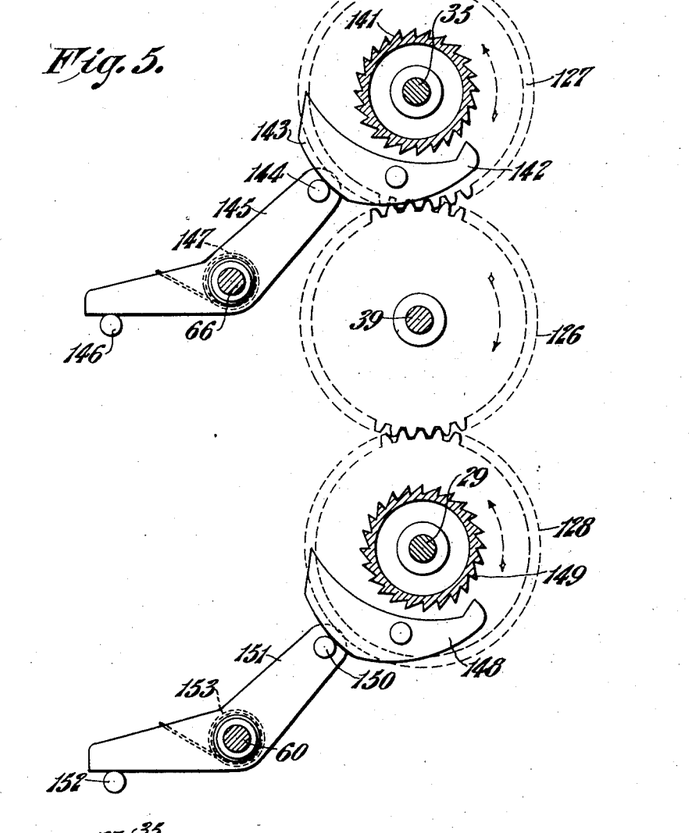

The resetting gears 127 and 128, which turn whenever shaft 39 is turned, are not rendered effective to drive gears 62 and 55 until after the clutches on shafts 29 and 35 have been opened. This is accomplished by the following means. Gear 62 (Fig. 3) has fixed thereto a ratchet 141 and gear 127 has pivotally mounted on it a pawl 142. This pawl, as shown in Fig. 5, has a weighted tail piece 143 which, when the resetting gear is in its initial position is supported by a pin 144 which projects laterally from a bell crank 145 (see Fig. 2). The latter is pivotally mounted on the counter shaft 66 (Fig. 5) and is yieldingly held against a stop pin 146 fixed on one side plate 16 by means of a torsion spring 147. This spring has its ends connected one to the said plate and one to the hub of the bell crank. At the end of the first 45° clockwise movement of the reset shaft 39, the tail piece 143 will have ridden off the supporting pin 144 and its weight will swing the pawl into engagement with the ratchet 141. The tail piece rides on pin 144 without swinging on its pivot during a certain initial angle during which the cams 131 effect release of the clutches on shafts 29 and 35. The pawl, when it rides off pin 144, will drive the ratchet and the pressure of the driving engagement will keep the pawl from falling away from the ratchet. The gear 62 and with it the gear train 65, 67 and 68 and shaft 69 will thus be driven to reset the number wheels. The arrangement is such that gear 62 will be driven one complete revolution by pawl 142. The gear 127 is turned 405° in a counterclockwise direction by the reset shaft 39 and then turned clockwise 45°. At the end of the counterclockwise movement, gear 62 will have been turned one complete revolution and the tail 143 of pawl 142 will lie below and to the right of pin 144. Then on the 45° movement in a clockwise direction the tail piece 143 will strike pin 144 and the pawl 142 will be moved back to the illustrated position. The spring 147 allows lever 145 to move, when engaged by pawl 142 in the counterclockwise rotation of gear 127, and allows free passage of the pawl without disengaging it from the ratchet 141.

The reset gear 128 carries a pawl 148 to drive a ratchet 149 on gear 55 and the engagement of pawl and ratchet is controlled by a pin 150 on a bell crank 151, mounted to turn on shaft 60 and yieldingly held against a stop pin 152 by a torsion spring 153 all in a manner identical with that just described. Thus, the gallons counters 17 and 17' may be reset by actuation of their shafts 57 and 59.

After the reset shaft 39 has been moved in a clockwise direction 405°, as viewed in Fig. 4, the notch 135 in disc 134 will come in under roll 137 and a spring 155, which connects pin 138 to a fixed point on one of the side panels as shown in Fig. 2, will pull the roll 137 into the notch and return the disc 134 to its initial position. At the time that the notch 135 comes into line with roll 137, the pawl 130 will lie on ratchet 129 near the high point of tooth 140. This tooth, as above described, is more than 45° in angular extent. Thus, the ratchet will be free to make the desired 45° retrograde movement which is limited by the abutment of tooth 156 with the end of pawl 130. This retrograde movement in addition to effecting release of pawls 142 and 148 as just described, also serves to swing the member 132 and cause its cams 131 to move the shifter 38 and lock together the clutch members 28 and 30 and the clutch members 34 and 36, thus reconnecting shafts 29 and 35 to the driving shafts 22 and 25, respectively.

Referring now to Fig. 4, the segment 136 has fixed thereto a pin 157 which at the end of the swinging movement of the segment to the right engages and moves a latch arm 158, causing the hook 159 thereon to be moved out of engagement with a projection 160 on a pawl 161. Arm 158 is pivoted on one side plate 16 as indicated in Fig. 2 and is urged toward projection 160 by a torsion spring 162, connected at one end to plate 16 and at the other to arm 158. Pawl 161 is similarly pivoted to the same side plate and it is urged upwardly by a torsion spring 163, connected at one end to said side plate and at the other end to the pawl. The pawl lies directly beneath segment 136. When the pawl 161 is released, the shoulder 164 on segment 136 will have moved to the right beyond the free end of the pawl. When, however, the segment 136 swings to the left at the start of its return movement the free end of the pawl will drop onto the surface 165 in position to prevent any attempted clockwise movement of shaft 39. The operator will be obliged to allow the segment 136 to swing back to its initial position and complete the intended resetting cycle. At the very end of such cycle, a rounded projection 166 on the segment will move pawl 161 downwardly out of the path of shoulder 164 and when it is so moved, the latch arm 158 will swing to the left enough to cause its hook 159 to engage the projection 165.

The operation will appear from the foregoing description and will be but briefly summarized. The meter-driven shaft 22 drives the gallons shaft 29 at the rate of one revolution per gallon. This shaft, operating through gears 55 and 56, drives the shaft 57 of counter unit 17' at the same speed, whereby the wheel of lowest order (graduated in tenths of a gallon) is caused to make one complete revolution for each revolution of shaft 29. The shaft 59 of the other gallons counter 17 is similarly driven through the gear 55, the idlers on shaft 60, and gear 58. The shaft 25 is driven from the shaft 22 through the variator at a speed representing unit price times quantity. Shaft 25 operates cost shaft 35 so that one revolution thereof equals ten cents. Shaft 35, operating through gears 62 and 63, drives the shaft 64 of cost counter 15' at equal speed, whereby the wheel of lowest order (graduated in cents) will move one revolution for each revolution of shaft 35. Shaft 69 of cost counter 15 is driven in the same way from shaft 35 through gears 62, 65, 67, and 68. The wheel of lowest order of each counter is driven forwardly from its shaft in a counting direction by means of the friction clutch shown in Fig. 10. Each revolution of such wheel causes the wheel of next highest order to be turned one step by means of the locking transfer gear in the usual way and each revolution of the second wheel causes the third wheel to be moved one step in the same way.

At the end of a dispensing operation, the operator manually turns reset shaft 39 and causes all the counters, both for gallons and for cost, to be reset to zero. The first movement of shaft 39 causes the release of the clutches on shafts 29 and 35 so that these shafts, and the gears 55 and 62 respectively fixed thereto, are free to revolve. The next increment of movement of shaft 39 causes the reset gears 128 and 127 to become coupled to gears 55 and 62, respectively, whereby the latter gears are turned reversely and caused to turn the counter shafts 57, 59, 64 and 69 backwardly. Considering the shaft 69 as illustrative of all four shafts just named, the effect of the change of direction is to unlock the number wheels 71 and 72 from the gears 97 and 97' of the locking transfer means, which holds these wheels stationary, except during the short intervals when the higher order wheel is advanced one step by the wheel next lower in order. The pin 120 on pawl 115 is cammed by the slot 119 in friction plate 109 to disengage the pawl from its groove 113 in the gear 97. Continued backward movement of shaft 69, acting through the clutch shown in Fig. 11, turns wheel 71 through plate 109 and pin 120. Wheel 72 is turned in the same way by a similar clutch. Wheel 70 is turned back by the clutch shown in Fig. 10. The wheels turn backwardly until arrested by abutment of their teeth 86 with the stop pawls 87. Movement of shaft 69 continues in a backward direction until one full revolution thereof has been completed. Meanwhile, the clutches slip and enable shaft 69 to turn while the number wheels remain stationary. After shaft 69 has moved one complete revolution, the reset shaft 39 has reached the end of its forward movement and is then turned backwardly through an angle of 45° by spring 155. This backward movement of the reset shaft operates first to uncouple gears 128 and 127 from the respective gears 55 and 62 and then to close the clutches on shafts 29 and 35. A succeeding dispensing operation will again drive shaft 69 in a counting direction and this reversal of rotation of the shaft will cause the cam slot 119 in friction plate 109 to reengage pawl 115 with the gear 97, thereby locking the number wheel to its transfer means.

The invention provides a simplified and improved counter construction. The resetting means and the means for locking and unlocking the wheels of higher order to and from the transfer gear are self-contained in a unit construction. This one counter unit can be assembled between the side plates 16 of the framework by placing the ends of its shaft, such as 69, in the bearings 73 and securing the latter in place by the screws 74. And the unit may be as easily removed. Only one connection to the counter unit is necessary, such for example as the gear 68. This gear when turned in one direction by the counter driving mechanism, mounted in the framework, drives shaft 69 forwardly, thereby actuating all the number wheels for the counting function. Similarly, when this same gear is operated by the counter-resetting means in the framework, shaft 69 is turned backwardly and all the number wheels are reset to zero. The one shaft serves both for advancing and resetting the number wheels. The unlocking of the higher order wheels from the transfer gears is effected simply and automatically by the reversal of the direction of rotation of the shaft on the change from counting to resetting direction, and the locking of such wheels and gears is effected by the change in direction of rotation of the shaft from resetting to counting direction. No means extraneous of the counter unit are necessary to effect the unlocking and subsequent locking of the higher order wheels and transfer gear. The structure for resetting and for locking and unlocking of the higher order wheels is simple, inexpensive to manufacture, and substantially foolproof in operation.

What I claim is:

1. In a counter, a plurality of number wheels, a single shaft for rotatably driving said wheels in both counting and resetting directions, locking transfer means between each wheel of higher order and the wheel of next lower order for intermittently actuating the higher order wheel in a counting direction, coupling means between each wheel of higher order and its transfer means, a single driving means for rotating the wheel of lowest order from said shaft in both counting and resetting directions and enabling slip between the wheel and driving means after the wheel has been turned back to zero on rotation of the shaft in a resetting direction, driving means one for each higher order wheel for rotating such wheel in a resetting direction from said shaft and enabling slip between the driving means and wheel after the wheel has been turned back to zero on rotation of said shaft in a resetting direction and during rotation of said shaft in a counting direction, and means operable by said shaft during its initial movement of rotation following a reversal of the direction of rotation of said shaft to actuate said coupling means uncoupling each wheel of higher order from its transfer means on a change from rotation in a counting direction to rotation in a resetting direction and coupling the wheel to its transfer means on a change from rotation in a resetting direction to rotation in a counting direction.

2. In a counter, a plurality of number wheels, a single shaft for supporting all said wheels and for rotating the same in both counting and resetting directions, locking transfer means between each wheel of higher order and the wheel of next lower order for intermittently actuating the higher order wheel in a counting direction, coupling means between each wheel of higher order and its transfer means, a single driving means on said shaft for rotating the wheel of lowest order from said shaft in both counting and resetting directions and enabling slip between the wheel and driving means after the wheel has been turned back to zero on rotation of the shaft in a resetting direction, driving means on said shaft one for each higher order wheel for rotating such wheel in a resetting direction from said shaft and enabling slip between the driving means and wheel after the wheel has been turned back to zero on rotation of said shaft in a resetting direction and during rotation of said shaft in a counting direction, and means operable by said shaft during its initial movement of rotation following a reversal of the direction of rotation of said shaft to actuate said coupling means uncoupling each wheel of higher order from its transfer means on a change from rotation in a counting direction to rotation in a resetting direction and coupling the wheel to the transfer means on a change from rotation in a resetting direction to rotation in a counting direction.

3. In a counter, a plurality of number wheels, a shaft from which said wheels are rotatably supported, locking transfer means for actuating a higher order wheel in a counting direction from a lower order wheel and including a driven gear for the higher order wheel, coupling means between each driven gear and the wheel it drives, a friction clutch between said shaft and the wheel of lowest order for rotating the same in both counting and resetting directions, a friction clutch between said shaft and each higher order wheel for rotating the latter in a resetting direction, and means operable by said shaft following reversal of the direction of rotation thereof to actuate said coupling means, uncoupling the wheel and gear when the shaft is first turned in a resetting direction and coupling the wheel and gear when the shaft is first turned in a counting direction.

4. In a counter, a plurality of number wheels, a single shaft from which all said wheels are supported and by which all are rotated both forwardly or backwardly in counting or resetting directions, counter driving means, counter resetting means, a single train of gearing adapted to be connected at one end either to said driving means or said resetting means and being connected at the other end to said shaft, means on said shaft for rotating the wheel of lowest order in both said directions and enabling slip between such means and wheel after the wheel has been turned back to zero on rotation of the shaft in a resetting direction, locking transfer means between adjacent wheels for rotating the wheel of higher order from the wheel of lower order and including a driven gear on said shaft; means on said shaft, one for each wheel except the wheel of lowest order, for turning its wheel backwardly after said gear has been unlocked from its wheel and including means operable by the shaft during its initial movement of rotation following a change in direction of rotation of said shaft to unlock or lock said gear and wheel accordingly as the change in direction of rotation is from counting to resetting or vice versa; the resetting driving means between said shaft and each higher order wheel including means enabling slip between it and the shaft during rotation of the shaft in a counting direction and also during rotation of the shaft in a resetting direction after the number wheel has been turned back to zero.

5. In a counter, having a shaft and two number wheels mounted side by side in closely adjacent relation and rotatably supported from said shaft, means for rotating said shaft in both counting and resetting directions, means on said shaft for rotating the lower order wheel in both counting and resetting directions, locking transfer means for intermittently rotating the higher order wheel in a counting direction from the lower order wheel and including a driven gear, a driving connection between said gear and higher order wheel including teeth provided on one and a pawl pivoted to the other and engaged between two of said teeth, a second driving connection between the higher order wheel and shaft for rotating such wheel in a resetting direction and including a frictionally driven member mounted on said shaft and having a cam groove therein, and a pin on said pawl engaged in said groove and adapted to be cammed thereby to move said pawl to uncouple the gear and wheel when the direction of rotation of said shaft is changed from the counting to the resetting direction and to couple the gear and wheel when the direction of rotation of the shaft is changed from the resetting to the counting direction.

6. In a counter, a frame including a pair of spaced side plates, counter driving means and counter resetting means mounted in said frame, a gear also mounted in said frame together with means for rotating it either from the driving or the resetting means, a counter unit including a supporting and driving shaft mounted at its ends in bearings one in each of said plates, a gear fixed to said shaft to mesh with the first-named gear and be rotated forwardly or backwardly accordingly as the first-named gear is driven by the counter driving or counter resetting means, a plurality of number wheels rotatably supported on said shaft, locking transfer means between adjacent wheels for intermittently actuating the higher order wheel in a counting direction from the lower order wheel, a friction clutch between the shaft and each number wheel for rotating its number wheel in a resetting direction, and means operable by said shaft during its initial movement of rotation following a change in direction of rotation of said shaft from counting to resetting direction to unlock each higher order wheel from its transfer means and following a change in direction of rotation from resetting to counting direction to lock each higher order wheel to its transfer means, the clutch for the wheel of lowest order being operable to rotate such wheel in a counting direction.

7. In a counter, a frame including a pair of spaced side plates, counter driving and counter resetting means mounted in said frame and a gear adapted to be rotated alternately and in opposite directions by said driving and resetting means, a counter unit including a shaft and a plurality of number wheels rotatably supported thereon, bearings removably secured one to each said plate and adapted to support the ends of said shaft, a gear fixed to said shaft to mesh with the first-named gear, means on said shaft one for each wheel for rotating its wheel in a resetting direction and enabling slip between the wheel and means after the wheel has been turned back to zero, stop pawls one for each wheel to arrest the latter in zero position, a shaft fixed at its ends in said plates and pivotally supporting all said pawls, means on said shaft for limiting the swinging movement of said pawls when the counter unit is removed from its bearings, locking transfer means between adjacent wheels for rotating the higher order wheel from the lower order wheel in a counting direction, each of the several driving means on said shaft enabling slip between it and its wheel when the wheel is turned in a counting direction, the driving means for the wheel of lowest order operable to drive its wheel in both counting and resetting directions, and means operable by said shaft during its initial movement of rotation following a change in direction of rotation of said shaft from counting to resetting direction to unlock each transfer means from the adjacent wheel of higher order and following by a change in direction of rotation from resetting to counting direction to lock said transfer means to said adjacent wheel of higher order.

8. In a counter, a shaft, first and second number wheels rotatably mounted thereon, means for rotating the first wheel in a counting direction, locking transfer means between the wheels for intermittently rotating the second wheel in a counting direction from the first wheel and at other times locking the second wheel against rotation, a releasable driving connection between the second wheel and said transfer means, a friction clutch on said shaft for rotating the second wheel back to zero after said connection is released, and means operable by said shaft and on the initial movement of rotation of said shaft in a resetting direction to release said connection.

9. In a counter, a shaft, first and second number wheels rotatably mounted thereon, means for rotating the first wheel in a counting direction, locking transfer means between the wheels for intermittently rotating the second wheel in a counting direction from the first wheel and at other times locking the second wheel against rotation, a releasable driving connection between the second wheel and said transfer means, a friction clutch on said shaft for rotating the second wheel back to zero after said connection is released, and means operable by said shaft and on the initial movement of rotation of said shaft in a resetting direction to release said connection, and operable by said shaft and on the initial movement of rotation of said shaft in a reverse direction to restore said connection.

10. In a counter, a shaft, first and second number wheels rotatably mounted thereon, means on said shaft for rotating the first wheel both in a counting and in a resetting direction, locking transfer means between the wheels for intermittently rotating the second wheel in a counting direction from the first wheel and at other times locking the second wheel against rotation, a releasable driving connection between the second wheel and said transfer means, a friction clutch on said shaft for rotating the second wheel back to zero after said connection is released, means operable by said shaft and on the initial movement of rotation of said shaft in a resetting direction to release said connection and operable by said shaft and on the initial movement of rotation of said shaft in a counting direction to restore said connection.

11. In a counter, having a frame including a pair of spaced side plates, driving and resetting means mounted in the frame, and a gear also mounted in said frame and adapted to be selectively coupled to either of said means and driven in opposite directions thereby, the combination of a complete counter removable from and replaceable in said frame as one unit and comprising a supporting and driving shaft, bearings for said shaft one in each of said plates and removably secured thereto, a gear on said shaft to mesh with the first-named gear, number wheels rotatably mounted on said shaft, locking transfer means between adjacent wheels for rotating the higher from the lower order wheel in a counting direction, means on said shaft for rotating the wheel of lowest order in both counting and resetting directions, means on said shaft one for each higher order wheel for rotating its wheel in a resetting direction, and means on said shaft operable during initial movement of rotation of the shaft following a reversal of rotation thereof to respectively unlock and lock each higher order wheel from its transfer gear accordingly as the rotative movement of the shaft changes from counting to resetting direction and vice versa.

12. In a counter, a shaft, first and second number wheels rotatably mounted thereon, means for rotating the first wheel in a counting direction, locking transfer means between the wheels for intermittently rotating the second wheel in a counting direction from the first wheel and at other times locking the second wheel against rotation, a releasable driving connection between the second wheel and said transfer means, a friction clutch on said shaft for rotating the second wheel back to zero after said connection is released, means operable by said shaft and on the initial movement of rotation of said shaft in a resetting direction to release said connection, and means for preventing rotation of the second wheel in a counting direction while said connection is released.

13. In a counter, a shaft, first and second number wheels rotatably mounted thereon, means for rotating the first wheel in a counting direction, locking transfer means between the wheels for intermittently rotating the second wheel from the first wheel in a counting direction and at other times locking the second wheel against rotation, said transfer means including a driven gear, a driving connection between said gear and second wheel including a series of teeth in one and a pawl pivoted to the other and engageable with any one of said teeth, means on said shaft for rotating the second wheel backwards to zero when said pawl is disengaged from said teeth, means operable by said shaft during its initial movement of rotation following a change in direction of rotation of said shaft to disengage and engage said pawl and teeth accordingly as the change is from counting to resetting direction or vice versa, and a spring engageable with said teeth in ratchet fashion for enabling rotation of the second wheel in a resetting direction and preventing rotation of the second wheel in a counting direction while the pawl is disengaged from said teeth.

14. In a counter, a shaft, first and second number wheels rotatably mounted thereon, means for rotating the first wheel in a counting direction, locking transfer means between the wheels for intermittently rotating the second wheel from the first wheel in a counting direction and at other times locking the second wheel against rotation, said transfer means including a driven gear, a driving connection between said gear and second wheel including a series of teeth on the gear and a pawl pivoted to the second wheel and engageable with any one of said teeth, a spring tending to hold the pawl engaged with one of said teeth and having an extension engageable with other teeth to prevent rotation of the wheel in a counting direction while said pawl is disengaged from the teeth, means on said shaft operable by said shaft during its initial movement of rotation following a change in direction of rotation thereof from counting to resetting to disengage said pawl and teeth and rotate the second wheel backwardly to zero and operable by a change in direction of rotation from resetting to counting direction to engage said pawl with one of said teeth, 15. In counting mechanism, having a counter unit including a plurality of number wheels, means for rotatively advancing them in a counting direction, and means for rotatively resetting the number wheels to zero, a main resetting shaft, a notched disc fixed thereon, a pivoted segment having a roll engaged in the notch of said disc and adapted to be moved out of said notch onto the periphery of the disc after said shaft has been rotated in a resetting direction through a predetermined angle, a spring acting on said segment to return it and said disc to its initial position when the roll enters said notch after one full revolution of said shaft from the point where the roll left said notch, said segment having a shoulder, a pawl to ride on said segment and adapted to engage said shoulder, a latch holding said pawl out of the path of said shoulder, a projection on the segment to engage and release said latch at the end of the first movement of the segment, whereby the pawl is allowed to ride on the segment, said pawl dropping in back of the shoulder during the initial part of the return movement of said segment in position to prevent a second movement of the segment in the first-named direction, and means operable by and at the end of the return movement of the segment to move the pawl away from the segment and into latching engagement with said latch.

16. In a counter, a plurality of number wheels, a shaft from which said wheels are rotatably supported, locking transfer means for actuating a higher order wheel in a counting direction from a lower order wheel and including a driven gear for the higher order wheel, coupling means between each driven gear and the wheel it drives, a friction clutch between said shaft and the wheel of lowest order for rotating the same in both counting and resetting directions, a friction clutch between said shaft and each higher order wheel for rotating the latter in a resetting direction, a cam mounted on said shaft with freedom to turn thereon throughout a limited angle, a slip clutch including an element fixed to the shaft for turning said cam throughout said angle in either direction of rotation of said shaft, and a cam follower connected to said coupling means to uncouple said wheel and gear when the shaft is first turned in a resetting direction and to couple said wheel and gear when the shaft is first turned in a counting direction.

WARREN H. DE LANCEY.